(12) United States Patent
Libman

(10) Patent No.: US 6,393,647 B1
(45) Date of Patent: May 28, 2002

(54) BROOM WITH MOUNTING BRACKET FOR DETACHABLE HANDLE

(75) Inventor: Robert Libman, Champaign, IL (US)

(73) Assignee: The Libman Company, Arcola, IL (US)

( * ) Notice: Subject to any disclaimer, the term of this patent is extended or adjusted under 35 U.S.C. 154(b) by 0 days.

(21) Appl. No.: 09/505,496

(22) Filed: Feb. 17, 2000

(51) Int. Cl.$^7$ .............................. A46B 15/00; B25G 3/12
(52) U.S. Cl. ...................... 15/145; 15/176.2; 15/159.1; 15/176.6; 15/175; 16/422; 403/315
(58) Field of Search ................... 15/145, 159.1, 15/171, 175, 176.1–176.3, 176.6, 146; 16/422, 426, 436, 440, DIG. 24, DIG. 25, DIG. 40, DIG. 41; 403/315–317

(56) References Cited

U.S. PATENT DOCUMENTS

| | | | |
|---|---|---|---|
| 76,995 A | 4/1868 | Christy | 411/116 |
| 138,946 A | 5/1873 | Smith | 15/146 |
| 245,733 A | 8/1881 | Long | 411/120 |
| 619,252 A | 2/1899 | Dupaw | 15/146 |
| 755,985 A | 3/1904 | Zacsek | 15/146 |
| 785,919 A | 3/1905 | Robertson | 411/119 |
| 878,282 A | 2/1908 | Eisel | 403/230 |
| 887,382 A | 5/1908 | Diplock | 411/120 |
| 1,015,263 A | 1/1912 | Clark | 15/177 |
| 1,134,076 A | 3/1915 | Hipkins | 15/146 |
| 1,621,273 A | 3/1927 | Read | 15/143.1 |
| 1,785,564 A | 12/1930 | Scheigert | 403/263 |
| 1,818,237 A | 8/1931 | Medean, Jr. | 30/193 |
| 1,877,125 A | 9/1932 | Evans | 15/120.1 |
| 1,983,923 A | 12/1934 | Stevens et al. | 403/198 |
| 2,090,412 A | 8/1937 | Geiger | 15/146 |
| 2,144,516 A * | 1/1939 | Van Dyke | 15/146 X |
| 2,212,778 A | 8/1940 | Jones | 384/40 |
| 2,442,684 A | 6/1948 | Greene, Sr. | 403/361 |
| 2,798,770 A | 7/1957 | Terrick | 301/35.624 |
| 2,815,989 A | 12/1957 | McCrink | 403/320 |
| 2,815,990 A | 12/1957 | McCrink | 403/320 |
| 2,922,179 A | 1/1960 | Lundgren | 15/146 |
| 3,183,540 A | 5/1965 | McCrink | 15/145 |
| 3,256,048 A | 6/1966 | Rea | 403/279 |
| 3,389,735 A | 6/1968 | Katz | 411/120 |
| 3,493,026 A | 2/1970 | Donofrio et al. | 411/120 |

(List continued on next page.)

FOREIGN PATENT DOCUMENTS

FR        1017484    *  9/1952 .................. 15/145

*Primary Examiner*—Mark Spisich
(74) *Attorney, Agent, or Firm*—Marshall, Gerstein, & Borun.

(57) ABSTRACT

A broom has a handle, a broom head, a bracket for securing the handle against rotation, and a plug for securing the bracket to the broom head. The handle has a segmented locking section near its mounting end, and can be attached to either of two opposed apertures in the broom head. The bracket has a pair of spaced-apart arms with locking faces that can engage the faces on the locking section. To enable the locking faces to engage onto the locking section from a radial direction, the open ends of the locking arms are spaced apart by a distance at least equal to the minor chord of the locking section. The bracket also has a locking aperture that allows it to be secured to the broom head by fastening the plug to the unused opposed aperture.

16 Claims, 7 Drawing Sheets

U.S. PATENT DOCUMENTS

| | | |
|---|---|---|
| 3,582,118 A | 6/1971 | Hogan .................... 403/320 |
| 4,050,494 A | 9/1977 | deClaire .................. 411/119 |
| 4,239,413 A | 12/1980 | Wludyka .................. 403/263 |
| 4,284,114 A | 8/1981 | Korenobu ................. 411/119 |
| 4,293,972 A | 10/1981 | Pomares ................... 15/145 |
| 4,541,139 A | 9/1985 | Jones et al. ............... 15/171 |
| 4,550,829 A | 11/1985 | Strahs .................... 206/361 |
| 4,734,001 A | 3/1988 | Bennett ................... 411/119 |
| 4,735,533 A | 4/1988 | Gallagher et al. .......... 411/119 |
| 4,906,150 A | 3/1990 | Bennett ................... 411/119 |
| 5,172,447 A | 12/1992 | Tomm ..................... 15/159.1 |
| 5,274,872 A | 1/1994 | Rich ....................... 15/145 |
| 5,337,440 A | 8/1994 | Vosbikian et al. ......... 15/143.1 |
| 5,371,916 A | 12/1994 | Vosbikian ................. 15/176.2 |
| 5,502,862 A | 4/1996 | Vosbikian ................. 15/175 |
| 6,219,883 B1 * | 4/2001 | Keichline ............. 15/176.2 X |

* cited by examiner

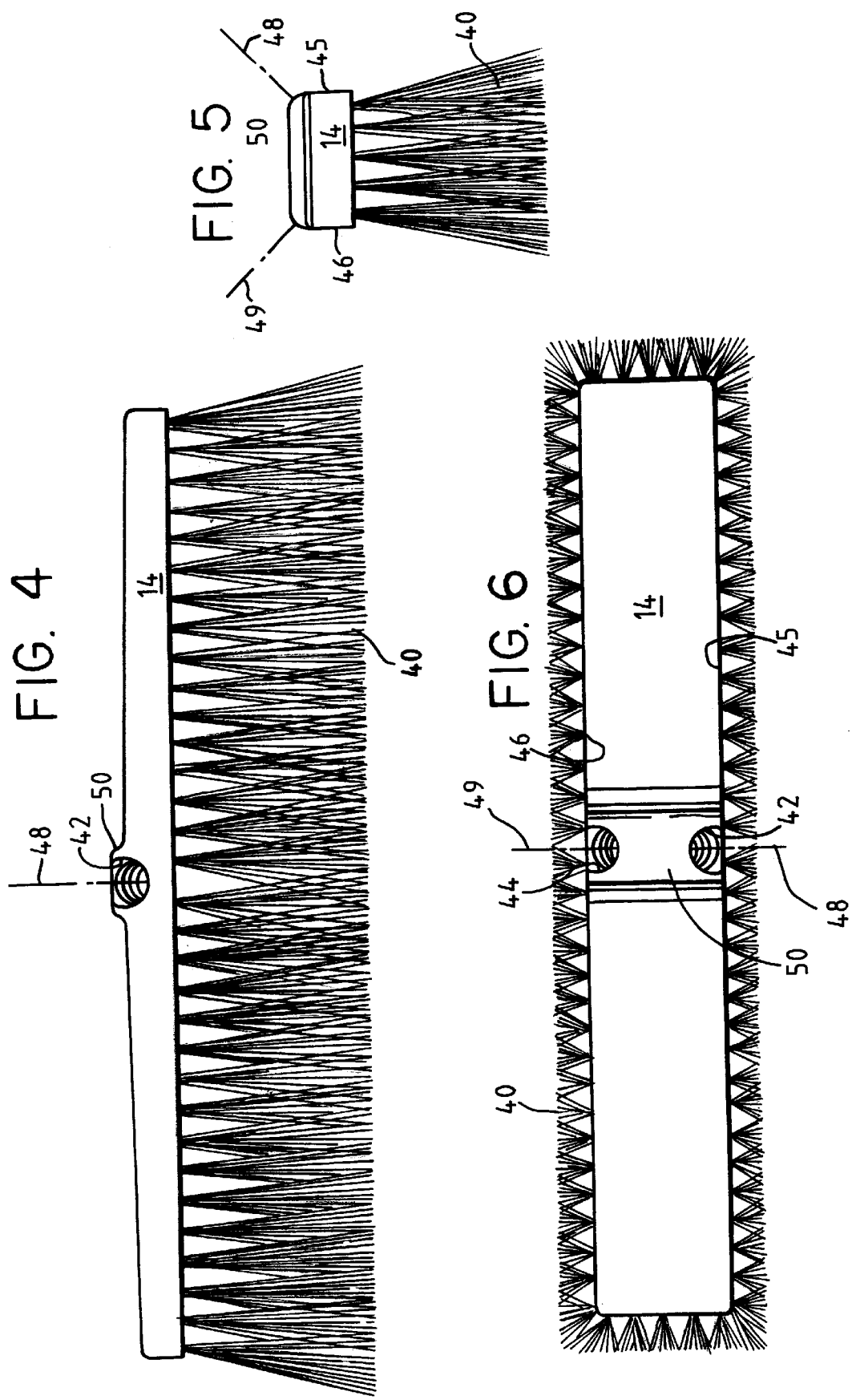

BROOM WITH MOUNTING BRACKET FOR DETACHABLE HANDLE

CROSS-REFERENCE TO RELATED APPLICATIONS

Not applicable.

STATEMENT REGARDING FEDERAL SPONSORSHIP

Not applicable.

BACKGROUND OF THE INVENTION

This invention relates generally to brooms. Brooms are sometimes classified as either "push" brooms or "upright" brooms. Upright brooms are often wider, and generally have relatively long fibers, with a handle aligned with the fibers to facilitate side-to-side sweeping. Push brooms generally have relatively short fibers set in a wide block, with a handle set at an angle to facilitate pushing the broom. Push brooms often have detachable handles. A detachable handle facilitates shipping, and can permit the handle to be reversed to prolong the life of the fibers. This invention specifically relates to brooms with detachable handles.

Conventionally, detachable handles are connected to broom heads by screwing a threaded end of the handle into a threaded aperture in the broom head. For some time it has been known that one of the problems with such brooms is that the handles can rotate and become loose during use. Various efforts have been made to solve this problem.

U.S. Pat. No. 138,946, for example, discloses the use of a set screw (g) that can be engaged against the handle of a broom in an effort to prevent rotation and loosening of the handle. The same idea was subsequently used in U.S. Pat. No. 5,337,440.

U.S. Pat. No. 755,985 discloses a bracket with curved plates (e) and (e') that can be tightened against the handle to reduce rotation. A more elaborate implementation of the same idea can be found in U.S. Pat. No. 1,015,263. The '263 patent discloses a set of opposing members 3 with inwardly projecting concave members that automatically tighten against the broom handle as the handle is threaded into the broom head. More recently, U.S. Pat. No. 5,371,916 appears to disclose the use of curved sidewalls to resist rotation of a handle without any additional mechanism for tightening the sidewalls.

U.S. Pat. Nos. 1,785,564; 1,983,923; and 4,293,972 disclose various implementations of the idea of passing a bolt or pin through a hole in a handle to prevent its rotation.

One early solution to the problem of handle loosening is suggested by U.S. Pat. No. 619,252. In that patent, as well as in later U.S. Pat. No. 2,090,412, rotation of the handle is prevented by mounting the handle in a square aperture, rather than a rounded one. One course, the use of a square aperture prevents the use of threads, thus requiring a separate mechanism for axially retaining the handle to the broom head. In the '252 patent, bails J are used to axially retain the handle.

More recently, U.S. Pat. Nos. 4,541,139 and 5,172,447 address the problem of handle rotation by providing a cap that can be screwed onto slotted portions of a collet surrounding the handle. As the cap is screwed onto the slotted portions, the collet tightens against the broom handle, providing resistance to rotation.

U.S. Pat. No. 5,502,862 discloses a metal bracket I that can be secured to the broom head after an opening 8 is passed over an end of the handle. The bracket is secured to the broom head by separate screws 18, 19. The lower end of the broom handle is provided with multi-sided section 26 that has the same geometric shape as the opening of the bracket, preventing the handle from being turned after the bracket is secured in place. While generally useful, this arrangement has several significant drawbacks.

The need to pass the bracket over an end of the handle can be inconvenient. It is sometimes desirable to provide the upper end of a broom with a shaped or cushioned handle, such as the one shown in U.S. Pat. No. 346,543, and such handles cannot readily be provided if the bracket must be able to pass over the upper end of the handle. A large handle, for example, would require a large opening in the bracket, which would accordingly require an even further enlarged multi-sided section at the bottom of the handle.

The use of the pair of screws disclosed in '862 patent for securing the bracket to the broom head can also be inconvenient. The disclosed screws require that additional holes be drilled into the broom head, adding costs, detracting from the appearance of the product, and potentially reducing its strength.

Finally, the arrangement disclosed in the '862 patent may not be completely secure if the fully-engaged position of the handle in the broom head (i.e, the position where the handle is tightest in the broom head) occurs at a position where the multi-sided section does not angularly correspond with the configuration of the opening in the bracket. For example, if the bracket of FIG. 4c of the '862 patent is used with a multi-sided section having the same configuration, the threaded end of the broom handle may bottom out in the threaded hole 15 in a position where the curved ends of the multi-sided section are 10 degrees short of the necessary position for securing the bracket to the broom head. If so, the handle will need to be unscrewed 170 degrees before the multi-sided section and the hole again align to enable the bracket to be secured in place. Such extensive unscrewing of the handle may result in wobble of the handle or other undesirable characteristics.

What is needed is an alternative and more convenient bracket arrangement for preventing rotation of the handle of a broom with respect to the broom head.

BRIEF SUMMARY OF THE INVENTION

This invention provides a significant improvement over the prior art. Like prior brooms, the broom has a handle with a mounting end, a central axis, and a multi-sided locking section disposed along the central axis near the mounting end. The locking section has a polygonal cross-section with faces and corners between the faces. The diameter of the locking section between opposed corners defines a major chord of the locking section, while the distance between opposed faces defines a shorter, minor chord.

The broom also has a broom head with two opposed apertures and a set of fibers. The handle is secured to the broom head by a locking bracket.

Unlike in prior brooms, the broom is provided with a plug that has a shaft that can be used to engage whichever of the two opposed apertures on the broom head is not being used for mounting the handle. The bracket comprises a locking aperture that can accommodate the shaft. Thus, the shaft can be passed through the locking aperture and then mounted in the opposed aperture on the broom head. This allows the bracket to be secured to the broom head without the need for additional holes to be drilled into the broom head.

Instead of a handle-locking opening that is closed, like the one shown in the '862 patent, the bracket has a pair of spaced-apart locking arms that enable the bracket to be attached in the proper position without passing the bracket over either end of the handle. The ends of the locking arms are spaced apart by a distance at least equal to the minor chord of the locking section. This enables the user to engage the bracket to the handle from a radial direction. When secured in position, locking faces on the locking arms engage the faces of the locking section near the corners, limiting rotation of the handle.

The resulting broom is simple to manufacture and easier to assemble, disassemble, and reassemble than previously-known brooms. Further advantages of the invention should be apparent to those skilled in the art upon reviewing the following detailed description in conjunction with the accompanying drawings, in which:

BRIEF DESCRIPTION OF THE DRAWINGS

FIG. 4 is an elevational view of the broom head of the broom of FIG. 1;

FIG. 5 is a side elevational view of the broom head of FIG. 4;

FIG. 6 is a top view of the broom head of FIG. 4;

DETAILED DESCRIPTION OF THE INVENTION

Figure 1:
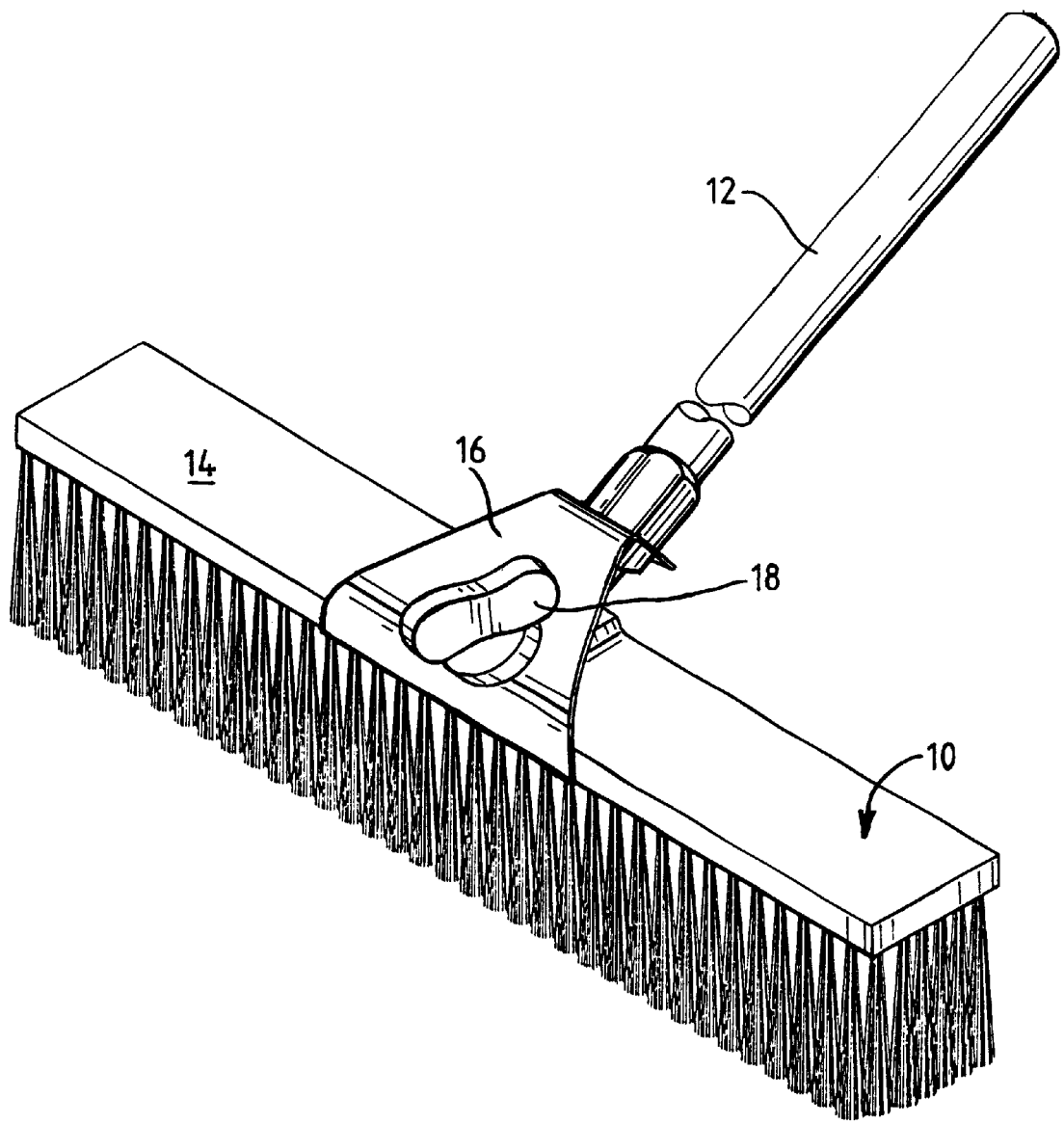
FIG. 1 is a fragmentary perspective view of a broom in accordance with an embodiment of this invention.

One embodiment of the broom that is the subject of this invention is shown in FIG. 1. The principal components of the broom 10 are a handle 12, a broom head 14, a locking bracket 16, and a plug 18.

Figure 2:
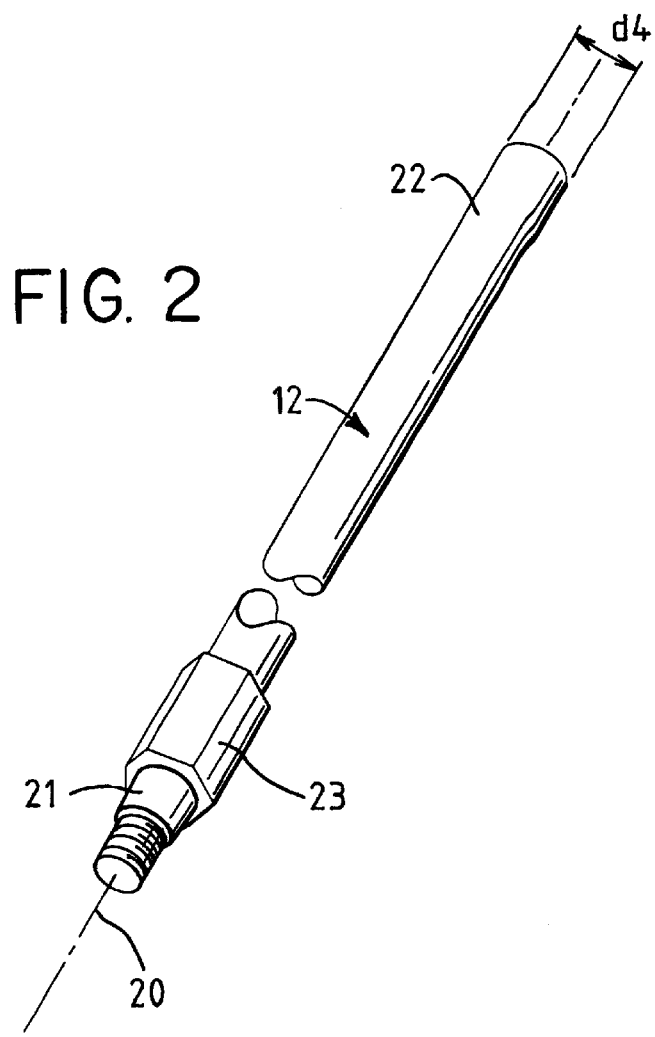
FIG. 2 is a fragmentary perspective view of the handle of the broom of FIG. 1.

As seen in FIG. 2, the handle 12 has a central axis 20, a mounting end 21, and a handle end 22. The handle can be made of any conventional material (such as plastic, metal, or wood), and have any conventional or convenient length and configuration. While the illustrated handle is straight and has a diameter of approximately 1", it could also have one or more bends or curves for added convenience or ease of use, and have a different diameter. It could also have a shaped handgrip at the handle.

Figure 3:
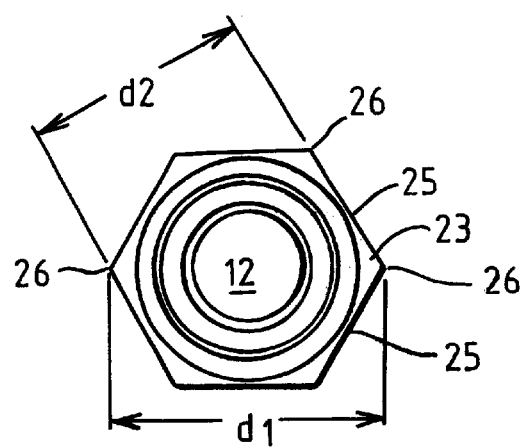
FIG. 3 is an end view of the handle of FIG. 2.

A locking section 23 is disposed along the central axis 20 of the handle near the mounting end 21. As illustrated, the locking section is a molded plastic part that has been fitted over the mounting end of the handle 12 and secured in place by a screw. As seen in FIG. 3, the locking section has a segmented cross-section with faces 25 and corners 26 between the faces. It is preferred (but not necessary) that the faces of the locking section have no concavities. More preferably, the faces of the locking section are all planar and the corners are sharp, rather than rounded. It is also preferred that the locking section have an even number of sides and corners, so that each side and corner has a diametrically-opposed opposite side or corner. It is further preferred (but again not necessary) that all sides of the locking section are of equal width.

As illustrated, the locking section 23 is about 2½ inches long and has a hexagonal cross section. The diameter of the locking section between opposed corners 26 defines a major chord d1, while the distance between opposed faces 25 defines a smaller, minor chord d2. As illustrated, the major chord d1 is about 1½ inches, while the minor chord d2 is about 1¼ inches. This difference (of about ¼ inch or about 20%) assists in the use of the mounting bracket 16, discussed below.

As seen in FIG. 4, the broom head 14 includes a set of fibers 40 for sweeping. The fibers can of any convenient or conventional length or composition, and can be mounted to the broom head in any convenient or conventional way. As illustrated, the fibers are approximately 4" long plastic bristles, grouped in tufts and mounted into holes in the bottom of the broom head.

The broom head 14 also includes a pair of opposed apertures 42, 44, seen in FIG. 6, that can be used alternately for mounting the handle 12. As is commonly known, broom bristles can become bent or worn after repeated use in one direction, and thus it is desirable to periodically reverse the handle direction. Including two opposed apertures in the broom head enables this to be done. As illustrated, one hole is disposed on each side 45, 46 of the broom head. The apertures have coplanar axes 48, 49, and are each disposed at a convenient angle of about 45 degrees with respect to the horizontal, and thus at an angle of approximately 90 degrees with respect to each other. The illustrated apertures extend through a thickened central section 50 of the broom head. The thickened central section provides additional support for the handle.

Figure 9:
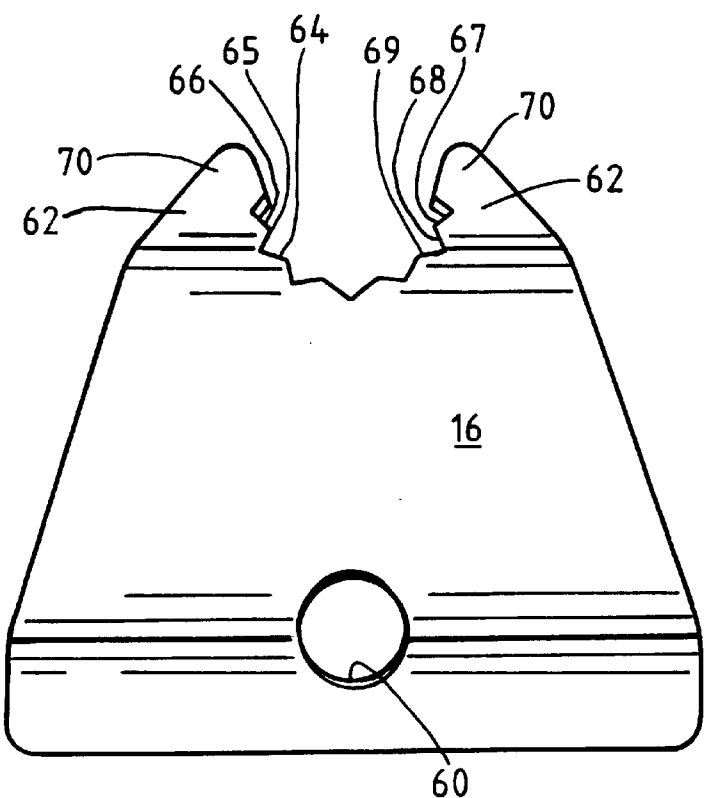
FIG. 9 is an plan view of the locking bracket of the broom of FIG. 1.

The locking bracket 16 of the broom 10, seen in FIG. 9, is used to limit rotation of the handle 12 after it is mounted in one of the opposed apertures 42, 44 in the broom head 14. The bracket is preferably made of a strong, rigid material. As illustrated, the bracket is an integral piece of 1/16" thick bent steel. The locking bracket includes a locking aperture 60 that is used to secure the bracket to the broom head. Preferably, the locking aperture has a circular shape and the same diameter as the opposed apertures on the broom head. As illustrated, the locking aperture has a diameter of approximately ¾".

Figure 10:
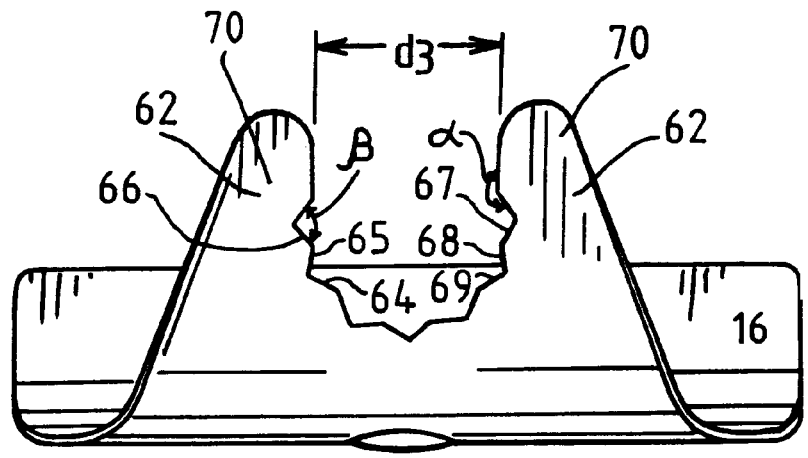
FIG. 10 is a rotated plan view of the locking bracket of FIG. 9.
Figure 11:
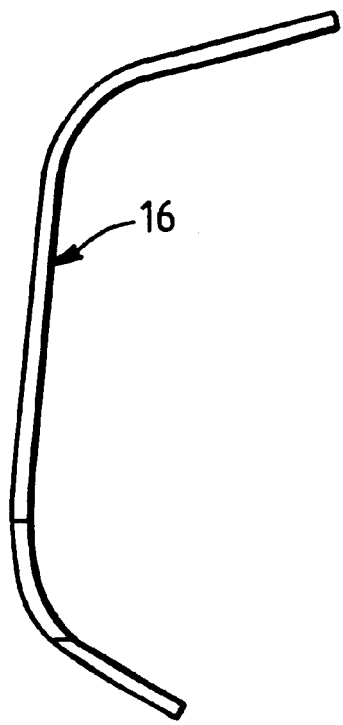
FIG. 11 is a an end view of the locking bracket of FIG. 9.

The locking bracket 16 also has a pair of spaced-apart locking arms 62 with locking faces 64–69. As best seen in FIG. 10, the ends 70 of the locking arms are spaced apart by a distance $d_3$ that is at least equal to the diameter of the broom and preferably at least equal to the minor chord d2 of the locking section 23 on the handle 12.

Figure 7:
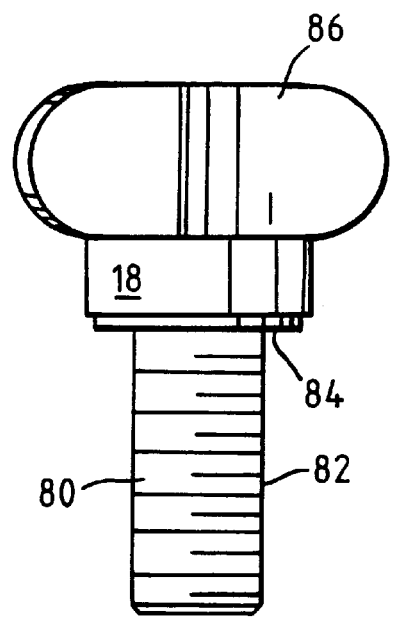
FIG. 7 is an elevational view of the plug of the broom of FIG. 1.
Figure 8:
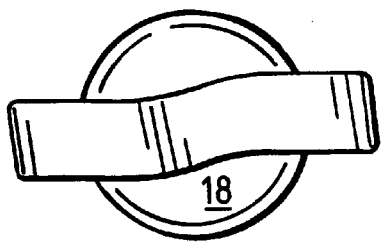
FIG. 8 is a plan view of the plug of FIG. 7.

The plug 18 of the broom 10, seen in FIG. 7, has a shaft 80 comprising means for engaging either of the opposed apertures 42, 44 on the broom head 14. As illustrated in FIG. 7, the plug is made of molded plastic. The shaft 80 is threaded with threads 82 that match those of the mounting end 21 of the handle 12, and has a collar 84 above those threads. Thus, when the locking aperture 60 in the bracket 16 is aligned with the unused opposed aperture in the broom head, and the shaft of the plug is passed through the locking aperture and secured in the unused aperture, the collar secures the bracket in position on the broom head. The plug can also be provided with an angled finger grip 86 to facilitate its attachment and removal from the broom head.

Figure 12:
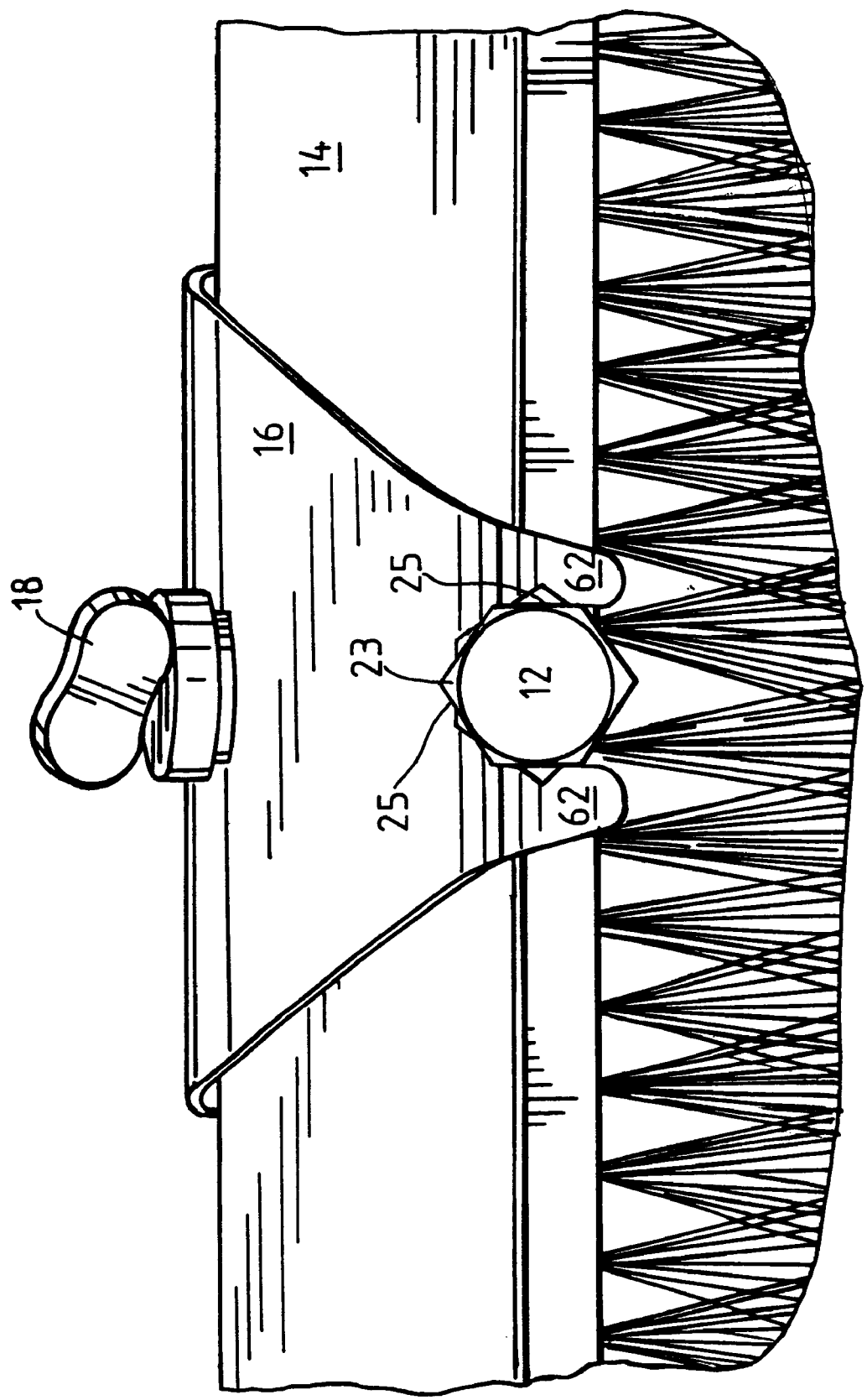
FIG. 12 is a fragmentary axial view of the broom of FIG. 1.

The bracket 16 of the broom 10 provides resistance to rotation of the handle 12 through the engagement of some of the locking faces 64–69 on the locking arms 62 with the faces 25 of the locking section 23 of the handle 12, as seen in FIG. 12. Preferably, for improved flexibility in possible mounting positions, the locking surfaces on the locking arms meet at alternating convex angles α and concave angles β, as illustrated in FIG. 10. For use with a broom having a hexagonal locking section, the locking surfaces on the locking arms can form convex angles α of approximately 210 degrees and convex angles β of approximately 120 degrees. By use of convex angles equal to approximately 180+180/n, where n=the number of faces on the locking section, the locking surfaces can provide twice the number of possible mounting positions that would be obtained if the locking section and locking surfaces where in geometric conformity (as taught by U.S. Pat. No. 5,502,862).

Figure 13:
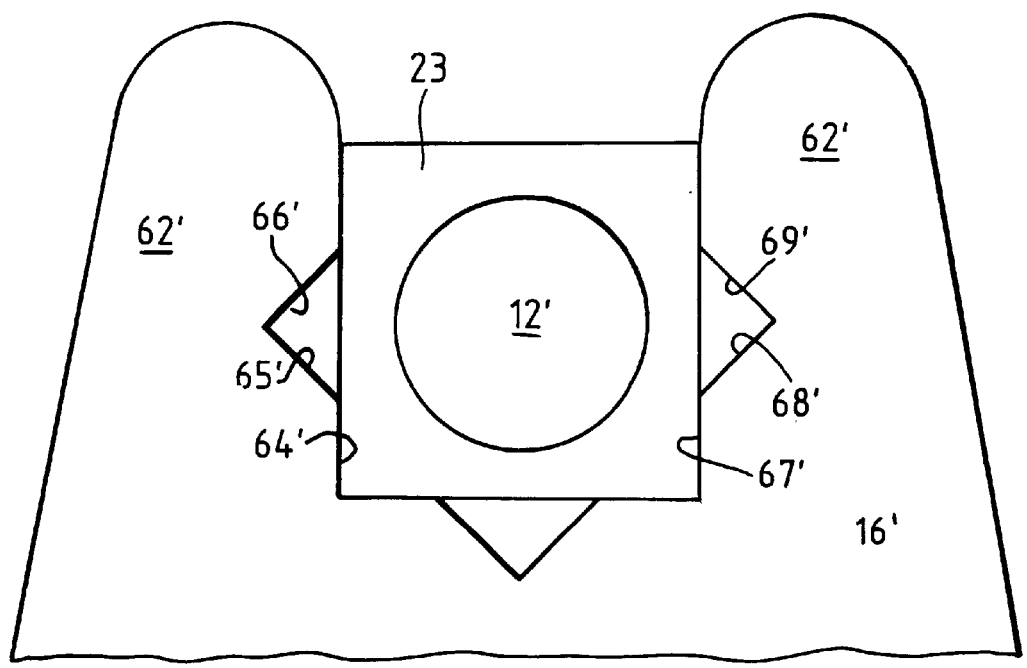
FIG. 13 is an enlarged fragmentary end view of an alternative embodiment of a handle in a bracket.
Figure 14:
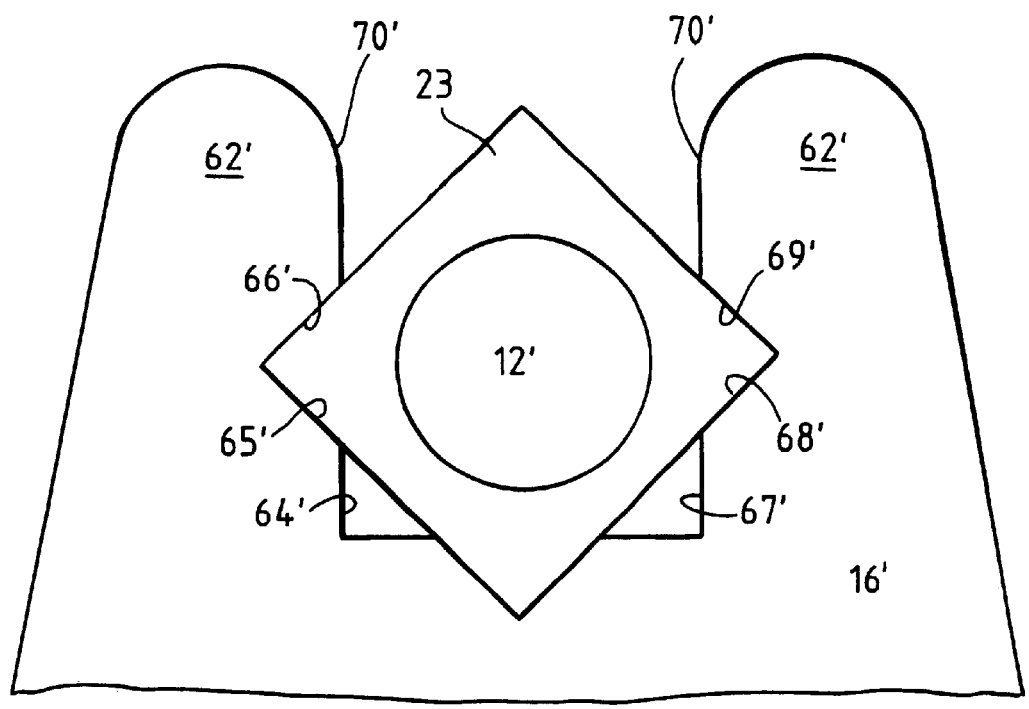
FIG. 14 is fragmentary end view of an alternative positioning of the handle of FIG. 13 in the bracket of FIG. 13.

Another convenient arrangement for the locking faces on the locking arms is illustrated in FIGS. 13 and 14. In those figures, the locking faces 64'–68" on the locking arms 62' meet at alternating angles of 90° and 225°. Such locking faces are useful for engaging a square-shaped locking section 23 in either of the two positions illustrated. (In order to engage the bracket in the position illustrated in FIG. 14, the bracket can be positioned axially just above the locking section 23 of the handle, and lowered into position. The ends 70' of the locking arms 62' being spaced at a distance greater than the diameter $d_4$ of the handle allows this locking position to be obtained from a radial direction, without the need to pass the bracket over the upper end 22 of the handle.)

This description of a broom has been only a description. Those skilled in the art will appreciate that many modifications can be made to the illustrated brooms and components without departing from the spirit or scope of the invention, which is set forth in the following claims.

What is claimed is:

1. A broom comprising:
   a handle with a mounting end, a central axis, a diameter, and a locking section disposed along the central axis near the mounting end, the locking section having a segmented cross-section with faces and corners between the faces;
   a broom head with two opposed apertures and a set of fibers;
   a bracket comprising both a locking aperture and a pair of spaced-apart locking arms, the arms having open ends that are spaced apart by a distance at least equal to the diameter of the handle;
   a plug with a shaft comprising means for engaging either of the opposed apertures on the broom head and thereby securing the bracket to the broom head; and
   locking faces on the locking arms comprising means for engaging the faces of the locking section near the corners when bracket is secured to the broom head.

2. A broom as recited in claim 1, in which the mounting end of the handle and the plug are threaded and have the same threads.

3. A broom as recited in claim 1, in which the locking aperture has the same diameter as the opposed apertures on the broom head.

4. A broom as recited in claim 1, in which the locking section has an even number of faces.

5. A broom as recited in claim 1, in which the locking section has an even number of corners.

6. A broom as recited in claim 1, in which all faces of the locking section are of equal width.

7. A broom as recited in claim 1, in which the faces of the locking section have no concavities.

8. A broom as recited in claim 1, in which the faces of the locking section are all planar.

9. A broom as recited in claim 1, in which the diameter of the locking section between opposed corners defines a major chord and the distance between opposed faces defines a smaller, minor chord, and the distance between the open ends of the locking arms is at least equal to the minor chord.

10. A broom as recited in claim 9, in which the major chord is at least about 15% greater than the minor chord.

11. A broom as recited in claim 1, in which the locking faces on the locking arms form alternating concave angles and convex angles.

12. A broom as recited in claim 1, in which the locking faces on the locking arms form convex angles of approximately α, where α=180+180/n, where n=the number of faces on the locking section.

13. A broom as recited in claim 1, in which the locking section has a hexagonal cross section and the locking faces the locking arms form concave angles of approximately 120 degrees and convex angles of approximately 210 degrees.

14. A broom as recited in claim 1, in which the bracket is an integral piece of steel.

15. A broom as recited in claim 1, in which the plug comprises an angled fingergrip.

16. A broom as recited in claim 1, in which the opposed apertures extend through a thickened central section of the broom head.

* * * * *

UNITED STATES PATENT AND TRADEMARK OFFICE
Certificate

Patent No. 6,393,647

Patented: May 28, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Libman, Champaign, IL (US); Enzo Berti, Venezia, Italy; and Marco Bizzotto, Padova, Italy.

Signed and Sealed this Seventeenth Day of December 2002.

*ROBERT J. WARDEN*
*Supervisory Patent Examiner*
*Art Unit 1744*